US008179398B2

(12) United States Patent
Yoshitake

(10) Patent No.: US 8,179,398 B2
(45) Date of Patent: *May 15, 2012

(54) SCREEN DISPLAY CONTROL DEVICE

(75) Inventor: Michio Yoshitake, Fukuoka (JP)

(73) Assignee: Seiko Epson Corporation, Tokyo (JP)

( * ) Notice: Subject to any disclaimer, the term of this patent is extended or adjusted under 35 U.S.C. 154(b) by 625 days.

This patent is subject to a terminal disclaimer.

(21) Appl. No.: 12/322,812

(22) Filed: Feb. 6, 2009

(65) Prior Publication Data

US 2009/0201563 A1 Aug. 13, 2009

(30) Foreign Application Priority Data

Feb. 7, 2008 (JP) .................................. 2008-027262
May 29, 2008 (JP) .................................. 2008-140405

(51) Int. Cl.
*G09G 5/39* (2006.01)
*G06T 9/00* (2006.01)

(52) U.S. Cl. .......................... 345/531; 345/555; 345/560

(58) Field of Classification Search .................. 345/531, 345/555, 572
See application file for complete search history.

(56) References Cited

U.S. PATENT DOCUMENTS

| 5,912,671 | A  | * | 6/1999 | Oka ............................. | 345/427 |
| 6,538,675 | B2 | * | 3/2003 | Aratani et al. ................ | 715/856 |
| 7,248,299 | B2 | * | 7/2007 | Shioji ...................... | 348/333.02 |
| 2002/0030686 | A1 | * | 3/2002 | Sakai et al. .................... | 345/531 |
| 2007/0273701 | A1 | * | 11/2007 | Mizukoshi et al. ........... | 345/531 |
| 2008/0303838 | A1 | * | 12/2008 | Funakubo ..................... | 345/545 |
| 2009/0115790 | A1 | * | 5/2009 | Tani et al. ..................... | 345/531 |
| 2009/0262123 | A1 | * | 10/2009 | Yoshitake et al. ............. | 345/555 |

FOREIGN PATENT DOCUMENTS

JP 2007-264572 10/2007

OTHER PUBLICATIONS

U.S. Appl. No. 12/322,805—Non-Final Office Action dated Sep. 12, 2011.

* cited by examiner

*Primary Examiner* — Kee M Tung
*Assistant Examiner* — Leon T Cain, II
(74) *Attorney, Agent, or Firm* — Nutter McClennen & Fish LLP; Michael P. Visconti, III; John J. Penny, Jr.

(57) ABSTRACT

A screen display control device includes: a compression unit which compresses input image data in a line unit; a rewritable image memory to which the compressed data compressed in the line unit by the compression unit is written in non-synchronization with a reading process; a decompression unit which decompresses the compressed data periodically read from the image memory in synchronization with screen display to restore original image data; a display unit which displays an image of the image data decompressed and restored by the decompression unit; a buffer memory which temporarily maintains compressed one-line data compressed by the compression unit; and a writing/reading control unit which controls the processes of writing and reading the compressed data to and from the image memory and processes of writing and reading the image data to and from the buffer memory. When the processes of reading and writing the compressed data of the same line to and from the image memory compete with each other, the writing/reading control unit controls the image data of the line to be written so as to be maintained in the buffer memory. The writing/reading control unit controls the process of reading the compressed data of the line maintained in the buffer memory upon reading the compressed data of the line.

6 Claims, 6 Drawing Sheets

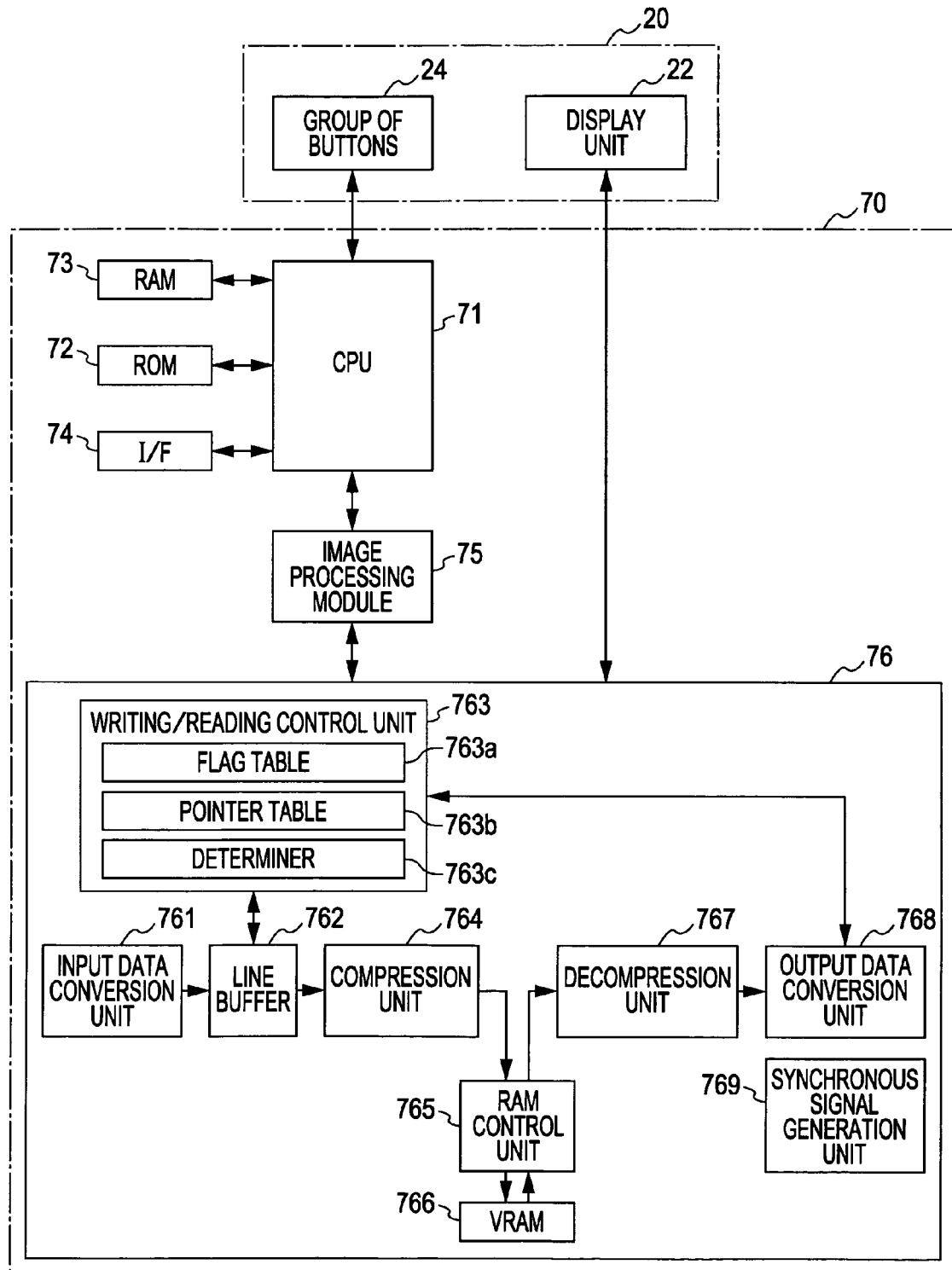

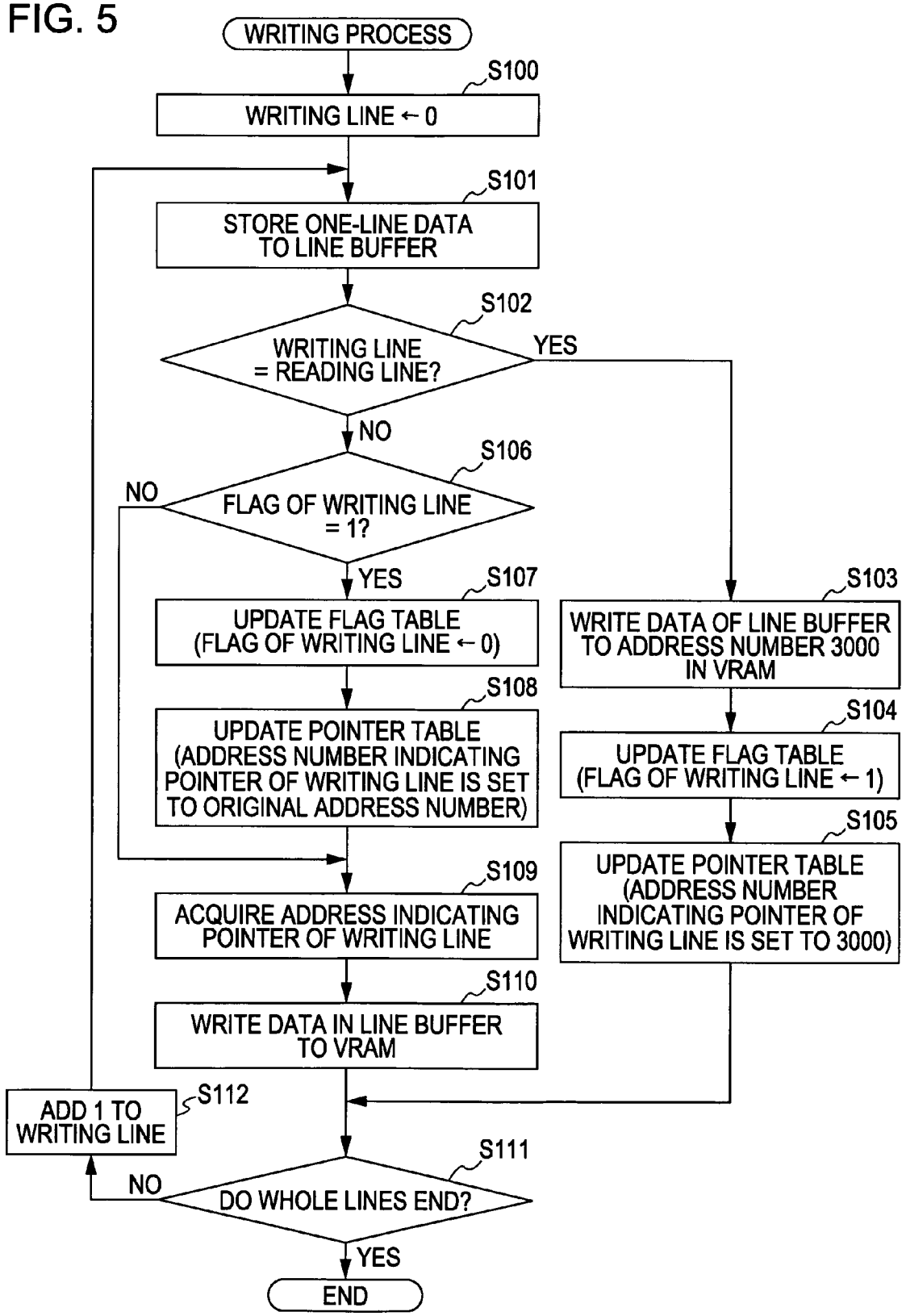

SCREEN DISPLAY CONTROL DEVICE

BACKGROUND

1. Technical Field

The present invention relates to a technique capable of controlling screen display.

2. Related Art

In the past, a screen display control device having a function of processing image data, which is disclosed in JP-A-2007-264572 (paragraphs 0017 and 0018, FIG. 1, etc.), for example, was known. The screen display control device generally includes an image memory (video RAM) temporarily storing the processed image data and performs screen display by periodically reading the processed image data stored in the image memory. In recent years, however, a screen display apparatus such as a liquid crystal display, a plasma display, or an organic EL display has a capability to realize high definition and high gray scale, thereby increasing a volume of image data to be displayed in the screen display apparatus. Therefore, the image memory storing the increased volume of image data needs to have a large capacity, thereby causing an increase in manufacture cost. In order to solve this problem, a technique capable of compressing the image data by a known data compression method such as a predictive encoding (DPCM encoding) method of encoding differences of adjacent pixel data and storing the compressed data in the image memory was suggested. In addition, upon performing screen display, original image data is restored by reading the compressed data from the image memory and decompressing the compressed data.

However, for example, when the image data are compressed in a line unit and the compressed data are stored in the image memory, processes of writing and reading the compressed data to and from the image memory in a line unit are performed. Since the processes of writing and reading the compressed data are performed asynchronously, the processes of writing and reading the compressed data of the same line compete with each other in some cases. Therefore, when the competition occurs, the following problems may occur. That is, the process of writing newly compressed data is performed ahead during the process of reading the compressed data stored in the image memory, or the process of reading the compressed data is performed ahead during the process of writing newly compressed data to the image memory. The image data are compressed using the differences of the adjacent data, as described above. Therefore, when the writing process is performed ahead or the reading process is performed ahead, the image data are not able to be restored after the above problem occurs even in the process of reading the compressed data. Accordingly, when the competition between the writing process and reading process occurs, a technique for preventing this problem from occurring is necessary.

SUMMARY

An advantage of some aspects of the invention is that it provides a technique for preventing processes of writing and reading compressed data of the same line to and from an image memory from being simultaneously performed.

According to an aspect of the invention, there is provided a screen display control device including: a compression unit which compresses input image data in a line unit; a rewritable image memory to which the compressed data compressed in the line unit by the compression unit is written in non-synchronization with a reading process; a decompression unit which decompresses the compressed data periodically read from the image memory in synchronization with screen display to restore original image data; a display unit which displays an image of the image data decompressed and restored by the decompression unit; a buffer memory which temporarily maintains compressed one-line data compressed by the compression unit; and a writing/reading control unit which controls the processes of writing and reading the compressed data to and from the image memory and processes of writing and reading the image data to and from the buffer memory. When the processes of reading and writing the compressed data of the same line to and from the image memory compete with each other, the writing/reading control unit controls the image data of the line to be written so as to be maintained in the buffer memory. In addition, the writing/reading control unit controls the process of reading the compressed data of the line maintained in the buffer memory upon reading the compressed data of the line.

In the screen display control device according to this aspect of the invention, when the processes of writing and reading of the compressed data of the same line to and from the image memory compete with each other, the writing/reading control unit controls the compressed data of the line to be written so as to be maintained in the buffer memory. Accordingly, it is possible to surely prevent the processes of writing and reading the compressed data of the same line to and from the image memory from being simultaneously performed. Moreover, since the writing/reading control unit controls the compressed data of the line maintained in the buffer memory upon reading the compressed data of the line, it is possible to surely read newly compressed data of the line maintained in the buffer memory. Accordingly, since the process of reading the compressed data remaining in the image memory is surely prevented, an image of the image data formed by allowing the decompression unit to restore the newly compressed data is displayed on the display unit.

In the screen display control device, the buffer memory may be formed in a vacant area of the image memory to maintain the compressed data. With such a configuration, it is possible to realize a simple configuration without providing a new buffer memory maintaining the compressed data.

In the screen display control device, the writing/reading control unit may include: an address storage unit which stores a memory address of each line of the image memory; and an address update unit which updates the memory address of the line stored in the address storage unit to a memory address of the vacant area, when the buffer memory maintains the compressed data of the line in the competition. With such a configuration, the necessary compressed data of a line is able to be easily read from the image memory using the memory address of each line of the image memory stored in the address storage unit. Moreover, when the buffer memory maintains the compressed data of the line where the competition between the writing process and the reading process occurs, the address update unit updates the memory address of the line stored in the address storage unit to the memory address of the vacant area. Therefore, it is possible to surely read the newly compressed data of the line stored in the vacant area and prevent the compressed data remaining in the memory area of the memory address before the update from being erroneously read.

BRIEF DESCRIPTION OF THE DRAWINGS

The invention will be described with reference to the accompanying drawings, wherein like numbers reference like elements.

FIG. 3 is a block diagram illustrating the configuration of a controller.

FIG. 5 is a diagram illustrating an example of a writing process.

DESCRIPTION OF EXEMPLARY EMBODIMENTS

Figure 1:
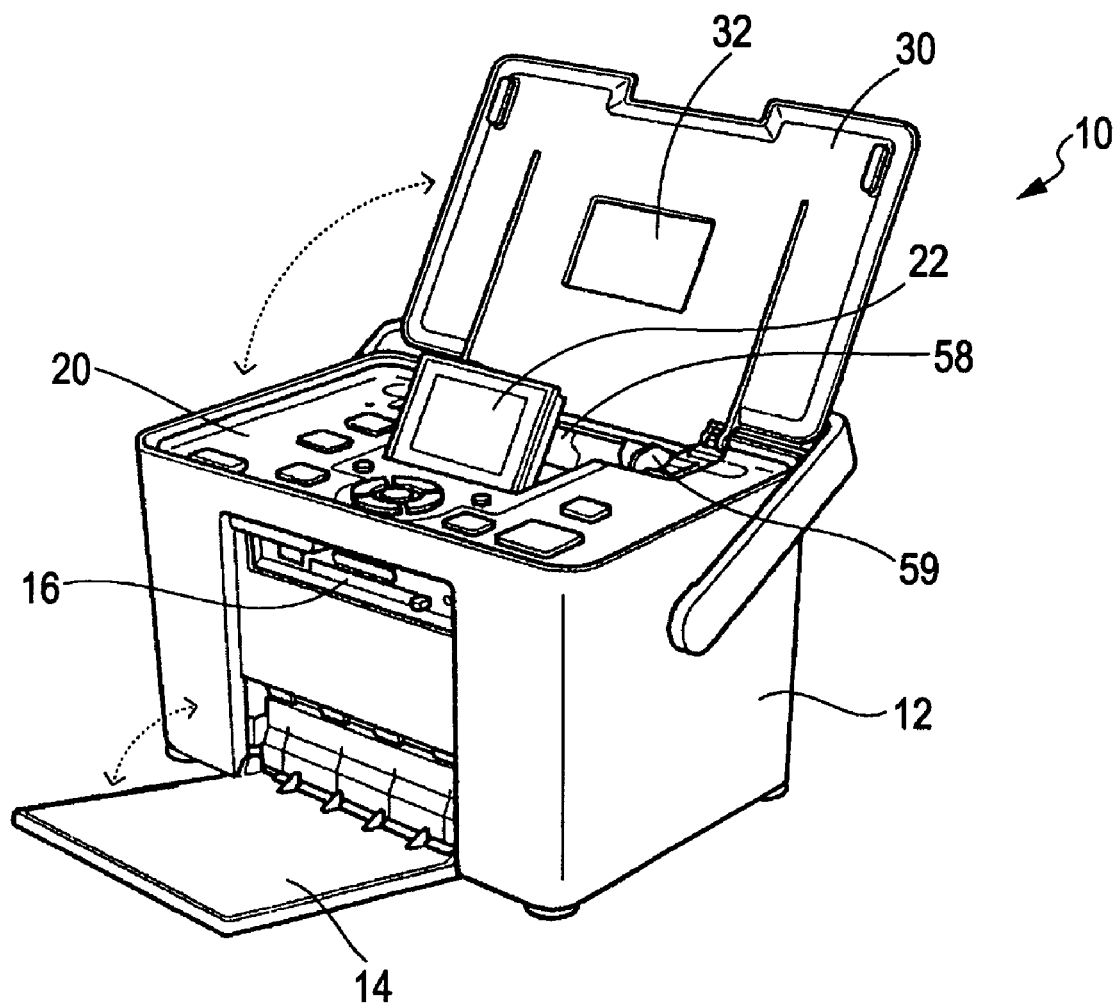
FIG. 1 is a perspective view illustrating a photo printer equipped with a screen display control device according to the invention.
Figure 2:
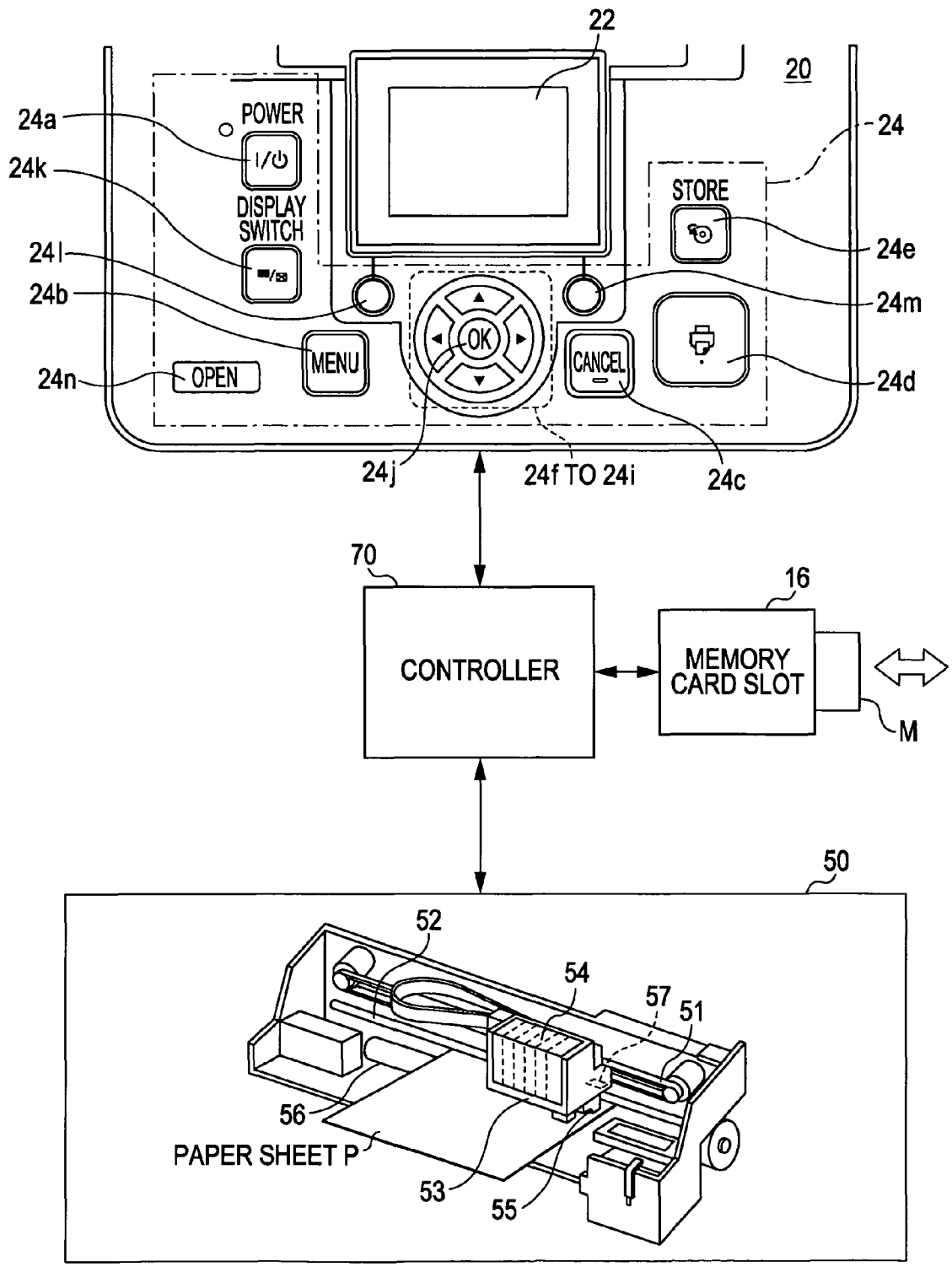
FIG. 2 is a diagram illustrating an overall internal configuration of the photo printer.

FIG. 1 is a perspective view illustrating a photo printer equipped with an LCD controller 76, which is an example of a screen display control device according to the invention. FIG. 2 is a diagram illustrating an overall internal configuration of the photo printer. A photo printer 10 has a printing mechanism 50 (see FIG. 2) inside a printer body 12 and prints an image on a paper sheet P in accordance with an operation command from a controller 70 (see FIG. 2) which controls the photo printer 10 on the whole. In addition, the printed paper sheet is discharged to a front surface of the printer body 12.

A front door 14 is openably mounted on the front surface of the printer body 12, as shown in FIG. 1. The front door 14 is a cover used to open and close the front surface of the printer body 12. When the front door 14 is opened, the front door 14 functions as a sheet discharging tray which receives the paper sheet P discharged from the print mechanism 50. In addition, a user is able to use various types of a memory card slot 16 formed on the front surface of the printer body 12. That is, when the front door 14 is opened, the user is able to insert a memory card M storing an image file, which is a printing target, into the memory card slot 16. An external medium storing an image file is not limited to the memory card, but may be a USB memory, a disk medium, or the like. An electronic apparatus such as a digital camera or a cellular phone storing images is connected to the photo printer 10 through a cable or infrared rays to function as the external medium.

An operational panel 20 is provided on the upper surface of the printer body 12 and a cover 30 is openably mounted on one side inside the upper surface of the printer body 12. The cover 30 is a resin plate formed with a size covering the upper surface of the printer body 12 and the surface of the operational panel 20 is exposed to the outside (see FIG. 1). On the other hand, when the cover 30 is closed, the cover 30 covers the entire operational panel 20.

The operational panel 20 includes a display unit 22 which is configured by as an LCD display displaying texts, figures, symbols, and the like and a group of buttons 24 arranged around the display unit 22. As shown in FIG. 2, the group of buttons 24 includes: a power button 24a used to turn on and off a power source; a menu button 24b used to allow a main menu to be displayed on a screen; a cancel button 24c used to cancel an operation during performing the operation or interrupt a printing process on the paper sheet P during the printing process; a print button 24d used to instruct a print execution onto the paper sheet P; a store button 24e used to store an edited image to the memory card M inserted into the memory card slot 16; upper, lower, right, and left arrow buttons 24f to 24i used to select a desired option among plural options displayed on the display unit 22, move a cursor, or other operations; an OK button 24j disposed in the center of the upper, lower, right, and left arrow buttons 24f to 24i and used to instruct the option selected by the arrow buttons 24f to 24i; a display switch button 24k used to switch screen display on the display unit 22; a left guide selection button 24l used to select a left guide displayed on the display unit 22; a right guide selection button 24m used to select a right guide displayed on the display unit 22; and a sheet discharging tray opening button 24n used to open the front door 14 functioning as a sheet discharging tray.

In order to confirm display details of the display unit 22, a window 32 having the same size as that of the display unit 22 is provided in the cover 30. That is, when the cover 30 is closed, the user is able to confirm the display details of the display unit 22 through the window 32. On the other hand, when the cover 30 is opened, the display unit 22 is configured so as to adjust a desired angle as shown in FIG. 1.

When the cover 30 is opened, the cover 30 is configured so as to be inclined toward the rear side with respect to the operational panel 20 to be maintained and used as a tray supplying the paper sheet P to the printing mechanism 50. Inside the operational panel 20, a sheet feeding port 58 of the printing mechanism 50 is provided and a pair of sheet guides 59 operated in a slide manner in right and left direction so that a guide width is matched with the width of the paper sheet are also provided.

The paper sheet P is fed to the printing mechanism 50 through the sheet feeding port 58 to perform the printing process. As shown in FIG. 2, the printing mechanism 50 is provided with a carriage 53 which is driven by timing belt 51 suspended in a loop shape in left and right directions to reciprocate in the right and left direction along a guide 52. The carriage 53 is provided with a sheet end detecting sensor 57 which detects the upper, lower, right, and left ends of the paper sheet P. That is, the sheet end detecting sensor 57 is capable of detecting the right and left ends of the paper sheet P to recognize the width of the paper sheet P or detecting the rear end of the paper sheet P during the printing process to recognize the length of the paper sheet P, when the carriage 53 scans the paper sheet P fed to the sheet feeding port 58 the right and left directions before the printing process.

Ink cartridges 54 individually containing colors such as cyan, magenta, yellow, and black are mounted on the carriage 53. The ink cartridges 54 are connected to a printing head 55. In addition, the printing head 55 ejects ink from nozzles (not shown) onto the paper sheet P by pressurizing ink from the ink cartridges 54. In this embodiment, the printing head 55 employs a method of pressurizing the ink with application of voltage to a piezoelectric element and deforming the piezoelectric element to pressurize the ink, but may employ a method of applying voltage to a heating resistant member (for example, a heater) and heating the ink to pressurize the ink by bubbles. The paper sheet P subjected to the printing process is transported to the opened front door (sheet discharging tray) 14 by a transport roller 56.

Even though not shown in the drawing, a battery pack is configured to be mounted in the rear surface of the printer body 12 to allow the battery pack to operate the photo printer 10 without connecting the photo printer 10 to a commercial power source. The photo printer 10 is able to be carried with ease and used anywhere, since the photo printer 10 is operated by the battery back and used as a stand-alone printer which does not need to be connected to a host computer.

Figure 4A:
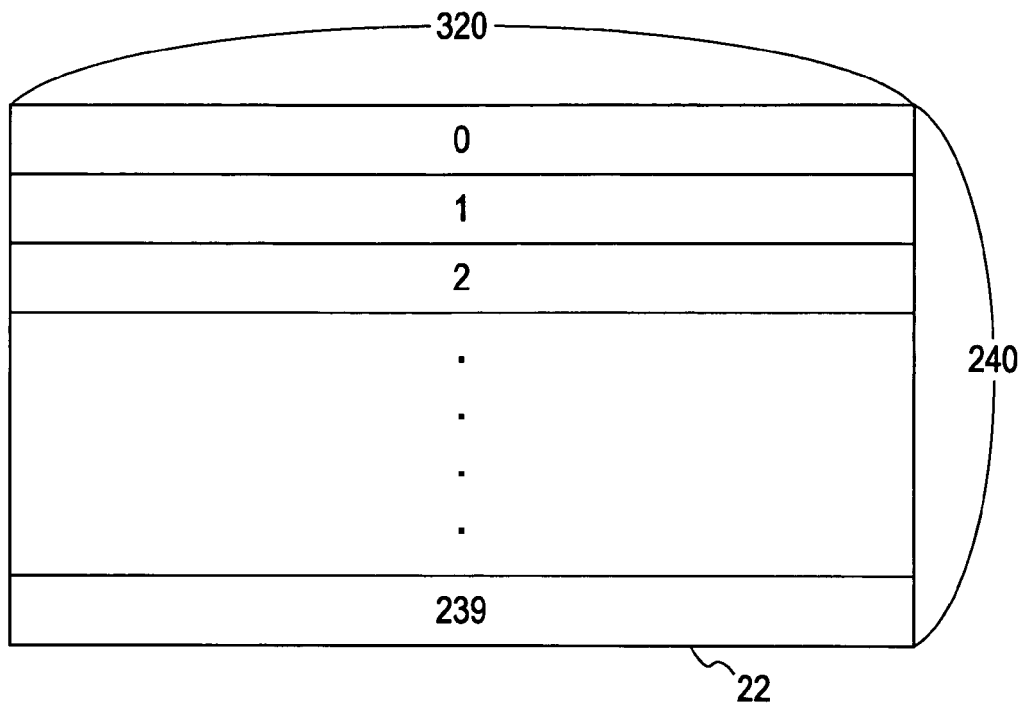
FIGS. 4A and 4B are diagrams illustrating the configurations of a display unit and a VRAM, respectively.
Figure 4B:
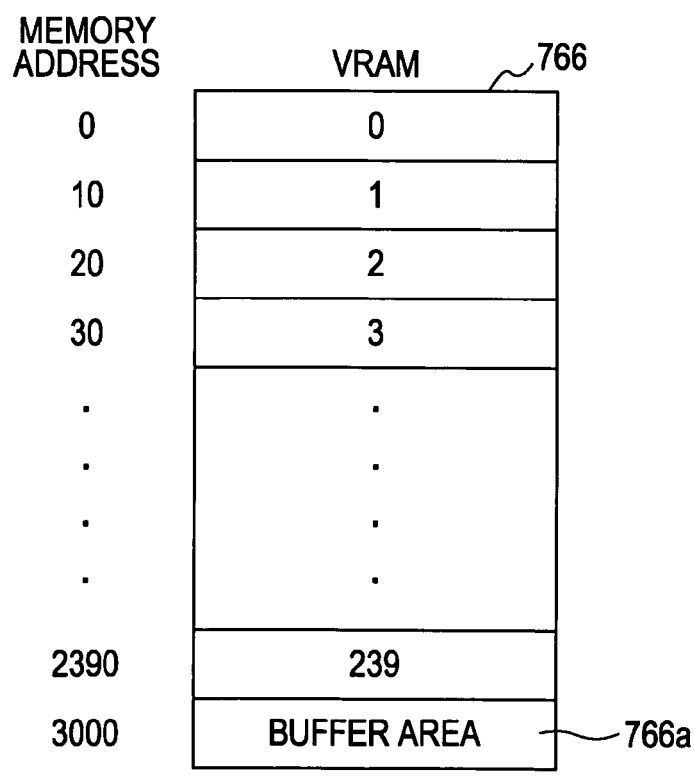

FIG. 3 is a block diagram illustrating the configuration of the controller 70. FIGS. 4A and 4B are diagrams illustrating the configurations of the display unit 22 and the VRAM 766, respectively. As shown in FIG. 3, the controller 70 is configured as a micro processor operated mainly by a CPU 71 and includes a ROM 72 which stores various processing programs, various data, various programs, various tables, and the like, a RAM 73 which temporarily stores data, and an interface (I/F) 74 which enables the printing mechanism 50 and the memory card slot 16 to communicate with each other. In addition, the controller 70 stores an edited image or the like to the memory card M and outputs a control signal to the printing head 55 of the printing mechanism 50 or a control signal to the display unit 22 of the operational panel.

The controller 70 is provided with an image processing module 75 which performs necessary image processing on image data supplied from an external storage medium such as the memory card M through the interface 74. The image processing module 75 has a function of generating image data corresponding to an image proper to a printer, such as a menu screen, for displaying the image data on the display unit 22.

RGB image data output from the image processing module 75 are supplied to the LCD controller 76 (corresponding to "a screen display control device" according to the invention) which controls displaying of the display unit 22. Hereinafter, the display unit 22 configured by an LCD display has pixels of 320 dots×240 dots of a QVGA (Quarter Video Graphics Array) mode. One line of image data is formed by image data corresponding to 320 dots and one image is formed by line data corresponding to 240 lines (see FIG. 4A).

The LCD controller 76 includes a synchronous signal generation unit 769 which generates horizontal and vertical synchronous signals for controlling timing at which an image is displayed on the display unit 22 and various synchronous signals. In addition, the LCD controller 76 includes an input data conversion unit 761 which converts serial data input from the image processing module 75 into parallel data and a line buffer 762 which temporarily maintains one-line data of the image data converted into the parallel data by the input data conversion unit 761. In addition, the LCD controller 76 includes a compression unit 764 which compresses the input image data in a line unit, a rewritable VRAM 766 (corresponding to "an image memory" according to the invention) to which the compressed data compressed in a line unit by the compression unit 764 are written in non-synchronization with a reading process, a decompression unit 767 which decompresses the compressed data periodically read from the VRAM 766 in synchronization with the horizontal and vertical synchronous signals of the screen display on the display unit 22 to restore an original image data, and an output data conversion unit 768 which performs data conversion to output the image data decompressed and restored by the decompression unit 767 onto the display unit 22. With such a configuration, the image data decompressed and restored by the decompression unit 767 are output and displayed onto the display unit 22 through the output data conversion unit 768. In this embodiment, the compression unit 764 is configured to compress the image data using difference information (accord status) of adjacent image data. However, the method of compressing image data is not limited thereto, but known various compression methods may be used. Since the method of compressing image data is a known technique, detailed description is omitted.

As shown in FIG. 4B, the VRAM 766 has an area where the compressed data of 240 lines (corresponding to one image) compressed by the compression unit 764 are stored and a buffer area 766a (corresponding to "a buffer memory" according to the invention) which is formed by a vacant area and capable of temporarily maintaining compressed one-line data. In this embodiment, the compressed data of lines 0, 1, 2, . . . , and 239 are stored in storage areas indicated by memory addresses 0, 10, 20, . . . , and 2390 of the VRAM 766, respectively. In addition, there is provided a writing/reading control unit 763 which controls processes of writing and reading the compressed data to and from the VRAM 766 and processes of writing and reading the image data to and from the buffer area 766a. Timing at which the compressed data are written to and read and from the VRAM 766 (the buffer area 766a) is controlled by allowing the writing/reading control unit 763 to output a control command to a RAM control unit 765.

Next, the writing/reading control unit 763 will be further described in detail. As shown in FIG. 3, the writing/reading control unit 763 includes a flag table 763a which stores flags of "0" and "1" indicating validity and invalidity of each compressed data stored in the storage area of each line of the VRAM 766 and a pointer table 763b which stores a memory address corresponding to each line in the VRAM 766. In this embodiment, the flag table 763a and the pointer table 763b are configured by rewritable memory. When the flag corresponding to each line stored in the flag table 763a is "0", the compressed data of the corresponding line are valid. When the flag is "1", the compressed data of the corresponding line are invalid.

The writing/reading control unit 763 includes a determiner 763c which controls the compressed data of the same line to be written so as to be maintained in the buffer area 766a, when the writing process is requested from the line buffer 762 or the reading process is requested from the output data conversion unit 768, and thus the processes of writing and reading the compressed data of the same line to the VRAM 766 compete with each other. That is, for example, when the processes of writing and reading the compressed data of a third line compete with each other, newly compressed data of the third line to be written to the VRAM 766 is written to the buffer area 766a expressed by a memory address 3000 to be temporarily maintained. In addition, when the compressed data of the line (third line) are read, the process of reading the compressed data of the line maintained in the buffer area 766a is controlled. That is, the determiner 763c simultaneously writes the newly compressed data of the line to the buffer area 766a and updates the memory address of the line (third line) stored in the pointer table 763b from a memory address "30" to the memory address "3000" which is a memory address of the vacant area. Therefore, when the process of reading the compressed data of the third line is requested from the output data conversion unit 768, the RAM control unit 765 is able to surely read the compressed data of the third line from the buffer area 766a expressed as the memory address "3000". That is because the memory address "3000" where the compressed data of the third line are stored is stored in the pointer table 763b. In this embodiment, as described above, the pointer table 763b functions as "an address storage unit" according to the invention and the determiner 763c functions as "an address update unit" according to the invention.

In this embodiment, the process of reading the compressed data from the VRAM 766 is performed in synchronization with screen display on the display unit 22, that is, the horizontal and vertical synchronous signals from the synchronous signal generation unit 769. On the other hand, since the process of writing the compressed data to the VRAM 766 is performed in non-synchronization with the reading process for the screen display, the competition between the processes of writing and reading the compressed data to and from the VRAM 766 occurs. Next, examples of the processes of writing and reading the compressed data to and from the VRAM 766 will be described with reference to FIGS. 5 and 6 according to the invention.

Writing Process

FIG. 5 is a diagram illustrating an example of the wiring process. First, the example of the writing process will be described with reference to FIG. 5. First, when the image data processed by the image processing module 75 to be displayed on the display unit 22 is input to the input data conversion unit 761 of the LCD controller 76, a counter value (writing line) of a writing line counter (not shown) constituted by a memory or the like is set to "0" (Step S100, see FIG. 4). That is, in the following process, it is determined whether the compressed data of a zeroth line are written to the VRAM 766. For easy understanding in the following description, the process of writing the compressed data of the zeroth line will be described with reference to FIG. 5. In addition, the writing line which is the counter value of the writing line counter refers to a value indicating a line number of the image data to be written to the VRAM 766.

In Step S101, the image data of the zeroth line set as the writing line in Step S100 are temporarily stored in the line buffer 762. Subsequently, in Step S102, the determiner 763c determines whether the writing line (zeroth line) is a reading line (see Step S200 of FIG. 6) described below, that is, whether the processes of writing and reading the compressed data of the zeroth line compete with each other. When YES is determined in Step S102, that is, when the processes of writing and reading the compressed data of the zeroth line compete with each other, a command for storing the image data stored in the line buffer 762 to the area of the memory address "3000" of the VRAM 766 is issued to the RAM control unit 765. That is, the image data of the zeroth line stored in the line buffer 762 are compressed by the compression unit 764 and then written to the buffer area 766a of the VRAM 766 (Step S103).

Subsequently, the determiner 763c updates the flag of the flag table 763a for the zeroth line, where the competition between the writing process and the reading process occurs, to "1", that is, sets the compressed data of the zeroth line stored in the memory address "0" of the VRAM 766 to be invalid (Step S104). Subsequently, the memory address where the compressed data of the zeroth line stored in the pointer table 763b are updated from the memory address "0" where the zeroth line is originally stored to the memory address "3000" of the buffer area 766a (Step S105). Alternatively, when NO is determined in Step S102, that is, when the determiner 763c determines that the processes of writing and reading the image data of the same line do not compete with each other, the process proceeds to Step S106. Then, the determiner 763c determines whether the flag of the flag table 763a corresponding to the writing line (zeroth line) is "1" (Step S106).

When NO is determined in Step S106, that is, when it is determined that the compressed data of the zeroth line stored in the memory address "0" of the VRAM 766 are valid, the process proceeds to Step S109. Subsequently, the determiner 763c acquires the memory address "0" to which the compressed data of the zeroth line are stored from the pointer table 763b, and a command for storing the image data stored in the line buffer 762 to the area of the memory address "0" of the VRAM 766 is issued to the RAM controller 765 (Step S110). That is, the image data of the zeroth line stored in the line buffer 762 are compressed by the compression unit 764 and then written to the VRAM 766.

Alternatively, when YES is determined in Step S106, that is, when it is determined that the compressed data of the zeroth line stored in the memory address "0" of the VRAM 766 are invalid, the process proceeds to Step S107. Then, the determiner 763c updates the flag of the flag table 763a for the zeroth line to "0" and updates the memory address of the VRAM 766 to which the compressed data of the zeroth line is written to "0" (Step S108). Subsequently, the determiner 763c acquires the memory address "0" to which the compressed data of the zeroth line are stored, that is, acquires the memory address "0" updated in Step S108 from the pointer table 763b, and a command for storing the image data stored in the line buffer 762 to the area of the memory address "0" of the VRAM 766 is issued to the RAM controller 765 (Step S110). That is, the image data of the zeroth line stored in the line buffer 762 are compressed by the compression unit 764 and then written to the VRAM 766.

Subsequently, the process proceeds to Step S111, and then it is determined whether the process of writing the compressed data corresponding to the whole lines (240 lines) ends. When YES is determined, the process ends. Alternatively, when NO is determined, one is added to the counter value (writing line) of the writing line counter in Step S112. The process proceeds to Step S101 to repeatedly perform the same process.

Reading Process

Figure 6:
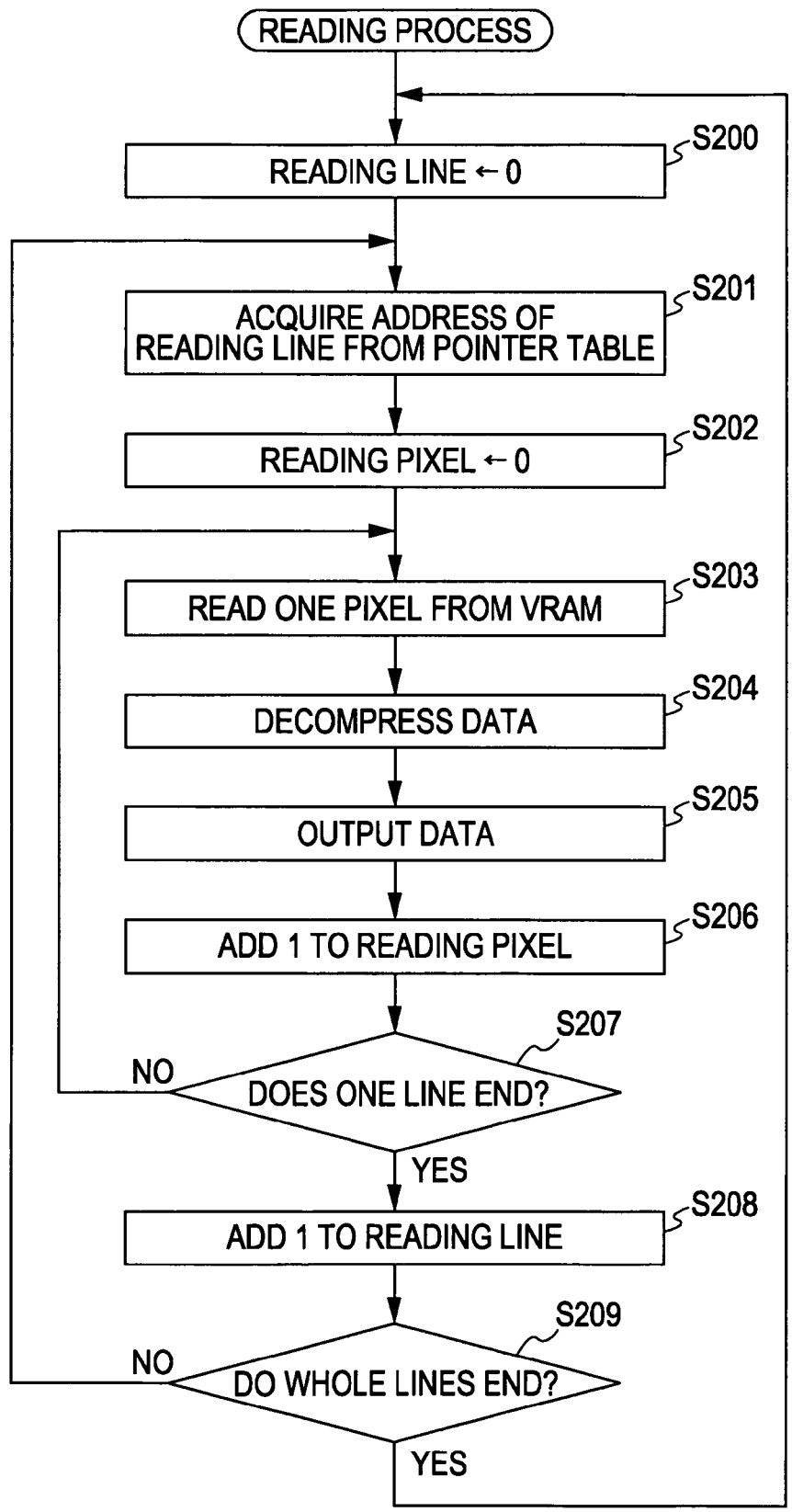
FIG. 6 is a diagram illustrating an example of a reading process.

FIG. 6 is a diagram illustrating an example of the process of reading the compressed data from the VRAM 766 to restore the image data. The example of the reading process will be described with reference to FIG. 6. The reading process in FIG. 6 is a process performed in synchronization with the vertical synchronous signal output every 1/60 second by the synchronous signal generation unit 769. In addition, the process of reading the compressed data of each line from the VRAM 766 is performed in synchronization with the horizontal synchronous signal output by the synchronous signal generation unit 769. First, when the vertical synchronous signal is output from the synchronous signal generation unit 769, a counter value (reading line) of a reading line counter constituted by a memory or the like is set to "0" (Step S200, see FIGS. 4A and 4B). In addition, the reading line which is the counter value of the reading line counter refers to a value indicating a line number of the compressed data to be read from the VRAM 766.

Subsequently, in Step S201, the number of the reading line from which the compressed data are read is output from the output data conversion unit 768 to the determiner 763c. Then, the determiner 763c transmits the memory address of the VRAM 766 where the compressed data of the corresponding line stored in the pointer table 763b to the output data conversion unit 768 (Step S201). Subsequently, when the synchronous signal generation unit 769 outputs the horizontal synchronous signal, the counter value (reading pixel) of the reading pixel counter constituted by a memory or the like is set to "0" (Step S202). The reading pixel which is the counter value of the reading pixel counter refers to a value added whenever each of the compressed pixel data for one pixel is read from compressed pixel data at the head of the compressed pixel data (320 data) constituting the compressed one-line data and refers to a value indicating which numbered pixel data from the head of the compressed pixel data is read to be restored.

Next, one compressed pixel data indicated by the reading line and the reading pixel is read from the VRAM 766 in Step S203, and the read pixel data is decompressed and restored by the decompression unit 767 (Step S204). Subsequently, each of the image (pixel) data restored in Step S203 is output to the display unit 22 through the output data conversion unit 768 (Step S205). Then, one is added to the counter value of the reading pixel counter (Step S206), and then it is determined whether the process of reading the compressed data of one line ends (Step S207).

When NO is determined in Step S207, the processes from Step S203 are repeatedly performed until the process of reading the compressed data of one line ends. Alternatively, when YES is determined in Step S207, one is added to the counter value of the reading line counter (Step S208), and it is determined whether the process of reading the compressed data of the whole lines ends in Step S209. When YES is determined in Step S209, the process proceeds to Step S200. When a subsequent vertical synchronous signal is output, the process is again performed from Step S200. Alternatively, when NO is determined in Step S209, the process is repeatedly performed from Step S201 until the process of reading the compressed data of the whole lines ends.

In this embodiment, as described above, the writing/reading control unit 763 controls the compressed data of the same line to be written so as to be maintained in the buffer area 766a, when the processes of writing and reading the compressed data of the same line to and from the VRAM 766 compete with each other. Therefore, it is possible to surely prevent the processes of writing and reading the compressed data of the same line to and from the VRAM 766 from being simultaneously performed. In addition, when the writing/reading control unit 763 reads the compressed data of the line, the process of reading the compressed data of the line maintained in the buffer area 766a is controlled. Therefore, it is possible to surely read newly compressed data of the line maintained in the buffer area 766a. With such a configuration, it is possible to surely prevent the compressed data remaining in the VRAM 766 from being read and display an image of the image data formed by allowing the decompression unit 767 to restore the newly compressed data on the display unit 22.

Since the buffer area 766a is formed by a vacant area of the VRAM 766 to maintain the compressed data, it is possible to realize a simple configuration without providing a new buffer memory for maintaining the compressed data.

The writing/reading control unit 763 includes the pointer table 763b which stores the memory address of each line of the VRAM 766 and the determiner 763c which updates the memory address of the line, where the competition between the writing process and reading process occurs, stored in the pointer table 763b to the memory address of the buffer area (vacant area) when the buffer area 766a maintains the compressed data of the line where the competition between the writing process and reading process occurs. With such a configuration, it is possible to easily read the necessary compressed data of a line from the VRAM 766 using the memory address of each line of the VRAM 766 stored in the pointer table 763b. When the buffer area 766a temporarily stores the compressed data of the line where the competition between the writing process and reading process occurs, the determiner 763c updates the memory address of the line stored in the pointer table 763b to the memory address of the buffer area 766a. Therefore, since the newly compressed data of the line stored in the buffer area 766a are surely read, it is possible to prevent the compressed data remaining in the memory area of the memory address before the updating from being erroneously read.

The invention is not limited to the above-described embodiment, but may be modified in various forms other than the above-described embodiment without departing the gist of the invention. For example, in the above-described embodiment, "the buffer memory" according to the invention is configured by the buffer area 766a which is the vacant area of the VRAM 766. However, "the buffer memory" may be configured by additionally providing a buffer memory. In addition, when the writing process and reading process again compete with each other in another line with the compressed data of the line where the competition between the writing process and reading process occurs maintained in the buffer area 766a, the compressed data of the line where new competition between the writing process and reading process occurs may be written to a memory area of the VRAM 766 where the flag stored in the flag table 763b is set to "1" (invalidity). In this case, by updating the memory address of the line, where the new competition between the writing process and reading process occurs, stored in the pointer table 763b to a memory address where the compressed data is newly stored, it is possible to surely read the compressed data of the line.

In the above-described embodiment, the ink cartridge type photo printer 10 is described as an example, but the invention may be applied to printing apparatuses such as other ink jet printers. Moreover, the invention is able to be widely applied to techniques for displaying an image on a screen display device such as a liquid crystal display, a plasma display, and an organic EL display.

What is claimed is:

1. A screen display control device comprising:
   a compression unit which compresses input image data into line units of compressed data;
   a rewritable image memory to which line units of compressed data compressed by the compression unit are written in non-synchronization with a reading process;
   a decompression unit which decompresses line units of compressed data periodically read from the image memory in synchronization with screen display during the reading process to restore original image data;
   a display unit which displays an image of original image data decompressed and restored by the decompression unit;
   a buffer memory which temporarily maintains compressed one-line data compressed by the compression unit; and
   a writing/reading control unit which controls writing compressed data to the image memory, reading compressed data from the image memory, writing compressed data to the buffer memory, and reading compressed data from the buffer memory,
   wherein, when writing a first line unit of compressed data corresponding to a particular line to the image memory competes with reading a second line unit or compressed data corresponding to the same particular line from the image memory, the writing/reading control unit writes the first line unit of compressed data to the buffer memory, and
   wherein the writing/reading control unit reads the first line unit of compressed data from the buffer memory when the reading process subsequently requires a line unit of compressed data corresponding to the particular line to be read.

2. The screen display control device according to claim 1, wherein the buffer memory is formed in a vacant area of the image memory.

3. The screen display control device according to claim 2, wherein the writing/reading control unit includes:
   an address storage unit which stores a memory address of each line of the image memory; and
   an address update unit which updates the memory address of the particular line stored in the address storage unit to a memory address of the vacant area, when a line unit of compressed data corresponding to the particular line is maintained in the buffer memory.

4. A screen display control device comprising:
- a rewritable image memory to which line units of compressed data are written in non-synchronization with a reading process;
- a microprocessor that compresses input image data into line units of compressed data and decompresses line units of compressed data periodically read from the image memory in synchronization with screen display during the reading process to restore original image data;
- a display which displays an image of original image data decompressed and restored by the microprocessor;
- a buffer memory which temporarily maintains compressed one-line data compressed by the microprocessor; and
- a write/read controller which controls writing compressed data to the image memory, reading compressed data from the image memory, writing compressed data to the buffer memory, and reading compressed data from the buffer memory,
- wherein, when writing a first line unit of compressed data corresponding to a particular line to the image memory competes with reading a second line unit of compressed data corresponding to the same particular line from the image memory, the write/read controller writes the first line unit of compressed data to the buffer memory, and
- wherein the write/read controller reads the first line unit of compressed data from the buffer memory when the reading process subsequently requires a line unit of compressed data corresponding to the particular line to be read.

5. The screen display control device according to claim 4, wherein the buffer memory is formed in a vacant area of the image memory.

6. The screen display control device according to claim 5, wherein the write/read controller includes:
- an address storage unit which stores a memory address of each line of the image memory; and
- an address update unit which updates the memory address of the particular line stored in the address storage unit to a memory address of the vacant area, when a line unit of compressed data corresponding to the particular line is maintained in the buffer memory.

* * * * *